United States Patent
Karandikar et al.

(10) Patent No.: US 9,838,408 B1
(45) Date of Patent: *Dec. 5, 2017

(54) SYSTEM, DEVICE AND METHOD FOR DETECTING A MALICIOUS ATTACK BASED ON DIRECT COMMUNICATIONS BETWEEN REMOTELY HOSTED VIRTUAL MACHINES AND MALICIOUS WEB SERVERS

(71) Applicant: FireEye, Inc., Milpitas, CA (US)

(72) Inventors: Shrikrishna Karandikar, Fremont, CA (US); Muhammad Amin, Fremont, CA (US); Shivani Deshpande, Fremont, CA (US); Yasir Khalid, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,320

(22) Filed: May 19, 2017

Related U.S. Application Data

(63) Continuation of application No. 15/213,306, filed on Jul. 18, 2016, now Pat. No. 9,661,009, which is a
(Continued)

(51) Int. Cl.
*H04L 29/06* (2006.01)
*G06F 9/455* (2006.01)

(52) U.S. Cl.
CPC ...... *H04L 63/1416* (2013.01); *G06F 9/45558* (2013.01); *H04L 63/1433* (2013.01); *H04L 63/20* (2013.01); *G06F 2009/45595* (2013.01)

(58) Field of Classification Search
CPC .................. H04L 63/1433; G06F 9/45558
See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

"Network Security: NetDetector—Network Intrusion Forensic System (NIFS) Whitepaper", ("NetDetector Whitepaper"), (2003).
(Continued)

*Primary Examiner* — Ali Shayanfar
(74) *Attorney, Agent, or Firm* — Rutan & Tucker, LLP

(57) ABSTRACT

In an embodiment, a system, device and method for detecting a malicious attack is described. Herein, the system includes a security network device that conducts an analysis on received network traffic to detect a suspicious object associated with the network traffic and determine an identifier associated with a source of the suspicious object. Information associated with the suspicious object and/or ancillary data, including information that identifies a return path for analysis results to a customer, are uploaded to a detection cloud. The detection cloud includes provisioning logic and one or more virtual machines that are provisioned by the provisioning logic in accordance with at least a portion of the ancillary data. The provisioning logic to customize functionality of the detection cloud for a specific customer.

55 Claims, 6 Drawing Sheets

Related U.S. Application Data continuation of application No. 14/316,714, filed on Jun. 26, 2014, now Pat. No. 9,398,028.

(56) References Cited

U.S. PATENT DOCUMENTS

| | | | |
|---|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,118,382 A | 9/2000 | Hibbs et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,571,221 B2 * | 8/2009 | Rao .................. H04L 29/06 709/220 |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |

(56) References Cited

U.S. PATENT DOCUMENTS

| | | |
|---|---|---|
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0202099 A1* | 10/2003 | Nakamura ............ H04N 7/181 348/153 |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0273856 A1 | 12/2005 | Huddleston |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |

(56) References Cited

U.S. PATENT DOCUMENTS

| | | |
|---|---|---|
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0185014 A1* | 8/2006 | Spatscheck ......... H04L 63/1458 726/23 |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0234409 A1* | 10/2007 | Eisen ................. H04L 63/0876 726/6 |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0097942 A1* | 4/2008 | Zhao ................. G06K 9/6229 706/13 |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0234904 A1* | 9/2009 | Dalgliesh .......... G06F 17/30489 709/201 |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |

(56) References Cited

U.S. PATENT DOCUMENTS

| | | |
|---|---|---|
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0035784 A1 | 2/2011 | Jakobsson |
| 2011/0040756 A1* | 2/2011 | Jones ............... G06F 17/30864 707/737 |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0158626 A1 | 6/2012 | Zhu et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0317642 A1 | 12/2012 | Royal et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0031600 A1 | 1/2013 | Luna et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0095717 A1* | 4/2014 | Danforth ............... H04L 41/12 709/226 |
| 2014/0130158 A1 | 5/2014 | Wang et al. |
| 2014/0130161 A1* | 5/2014 | Golovanov ........... G06F 21/564 726/23 |
| 2014/0137180 A1 | 5/2014 | Lukacs et al. |
| 2014/0169762 A1 | 6/2014 | Ryu |
| 2014/0173739 A1 | 6/2014 | Ahuja et al. |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0365640 A1* | 12/2014 | Wohl ............... G06K 7/10227 709/224 |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1* | 4/2015 | Ismael ............... G06F 21/566 726/23 |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0372980 A1 | 12/2015 | Eyada |
| 2016/0044000 A1 | 2/2016 | Cunningham |
| 2016/0127393 A1 | 5/2016 | Aziz et al. |

FOREIGN PATENT DOCUMENTS

| | | |
|---|---|---|
| WO | 02/06928 A2 | 1/2002 |
| WO | 0206928 | 1/2002 |
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |

(56) References Cited

FOREIGN PATENT DOCUMENTS

| WO | 2013/067505 A1 | 5/2013 |
|---|---|---|
| WO | 2015/009411 A1 | 1/2015 |

OTHER PUBLICATIONS

"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
AltaVista Advanced Search Results. "attack vector identifier". Http://www.altavista.com/web/results?Itag=ody&pg=aq &aqmode=aqa=Event+Orch- estrator . . . , (Accessed on Sep. 15, 2009).
AltaVista Advanced Search Results. "Event Orchestrator". Http://www.altavista.com/web/results?Itag=ody&pg=aq &aqmode=aqa=Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael , et al., "Simulating Realistic Network Traffic for Worm Warning System Design and Testing", Institute for Security Technology studies, Dartmouth College ("Liljenstam"), (Oct. 27, 2003).

(56) References Cited

OTHER PUBLICATIONS

Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/ usenixsecurity12/sec12- -final107.pdf [retrieved on Dec. 15, 2014].
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J. , et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security Jul. 28, 2008-Aug. 1, 2008 San Jose, CA.
PCT/US2014/043724 filed Jun. 23, 2014 International Search Report and Written Opinion dated Oct. 31, 2014.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Spitzner, Lance , "Honeypots: Tracking Hackers", ("Spizner"), (Sep. 17, 2002).
The Sniffers's Guide to Raw Traffic available at: yuba.stanford. edu/.about.casado/pcap/section1.html, (Jan. 6, 2014).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 14/042,482, filed Sep. 30, 2013 Advisory Action dated Sep. 2, 2015.
U.S. Appl. No. 14/042,482, filed Sep. 30, 2013 Final Office Action dated Feb. 3, 2015.
U.S. Appl. No. 14/042,482, filed Sep. 30, 2013 Non-Final Office Action dated Jul. 16, 2014.
U.S. Appl. No. 14/042,482, filed Sep. 30, 2013 Non-Final Office Action dated Nov. 23, 2015.
U.S. Appl. No. 14/316,714, filed Jun. 26, 2014 Non-Final Office Action dated Aug. 13, 2015.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
U.S. Appl. No. 13/945,394, filed Jul. 18, 2013 Non-Final Office Action dated Mar. 10, 2015.
U.S. Appl. No. 13/945,394, filed Jul. 18, 2013 Notice of Allowance dated Jan. 6, 2016.
Venezia, Paul , "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

SYSTEM, DEVICE AND METHOD FOR DETECTING A MALICIOUS ATTACK BASED ON DIRECT COMMUNICATIONS BETWEEN REMOTELY HOSTED VIRTUAL MACHINES AND MALICIOUS WEB SERVERS

CROSS REFERENCE TO RELATED APPLICATIONS

This application is a continuation of U.S. patent application Ser. No. 15/213,306 filed Jul. 18, 2016, now U.S. Pat. No. 9,661,009 issued May 23, 2017, which is a continuation of U.S. patent application Ser. No. 14/316,714 filed Jun. 26, 2014, now U.S. Pat. No. 9,398,028 issued Jul. 19, 2016, the entire contents of which are incorporated by reference herein.

FIELD

Embodiments of the disclosure relate to the field of network and cyber security. More specifically, one embodiment of the disclosure relates to a system, device and method for detecting a malicious attack based, at least in part, on real-time communications with a web server associated with network traffic determined to be suspicious.

GENERAL BACKGROUND

Over the last decade, malicious attacks have become a pervasive problem for Internet users as most networked resources include vulnerable software. For instance, over the past few years, more and more vulnerabilities are being discovered in software that is loaded onto network endpoints, such as vulnerabilities within operating systems and applications installed on endpoint systems. While some software vulnerabilities continue to be addressed through software patches, network endpoints will continue to be targeted for attack in efforts to acquire sensitive information or adversely affect operations of various enterprises.

In general, efforts have been made to counter malicious attacks over web traffic. One effort has been directed to security appliances that monitor web traffic coming into an enterprise network and performs both preliminary and virtual machine (VM) based analysis of objects associated with the web traffic in order to detect the presence of exploits. Although effective in detecting malicious attacks, these types of security appliance have a few challenges.

In its current configuration, the security appliance handles VM-based analysis, which consumes a great amount of processing and memory resources. Due to memory and/or processing constraints that exist for all standalone security appliances, there will be limits on the number of virtual machines (VMs) as well as the number of permutations of software profiles (e.g., software images of operating systems and application versions) that can be supported by the security appliance. Also, as most of the memory and/or processing resources with the security appliance are directed to preliminary and VM-based analysis, it is difficult to introduce new or experimental features or enhancements without increased processing or memory, as such features or enhancements would equate to lesser processing and/or memory reserved for core preliminary or VM-based analysis.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
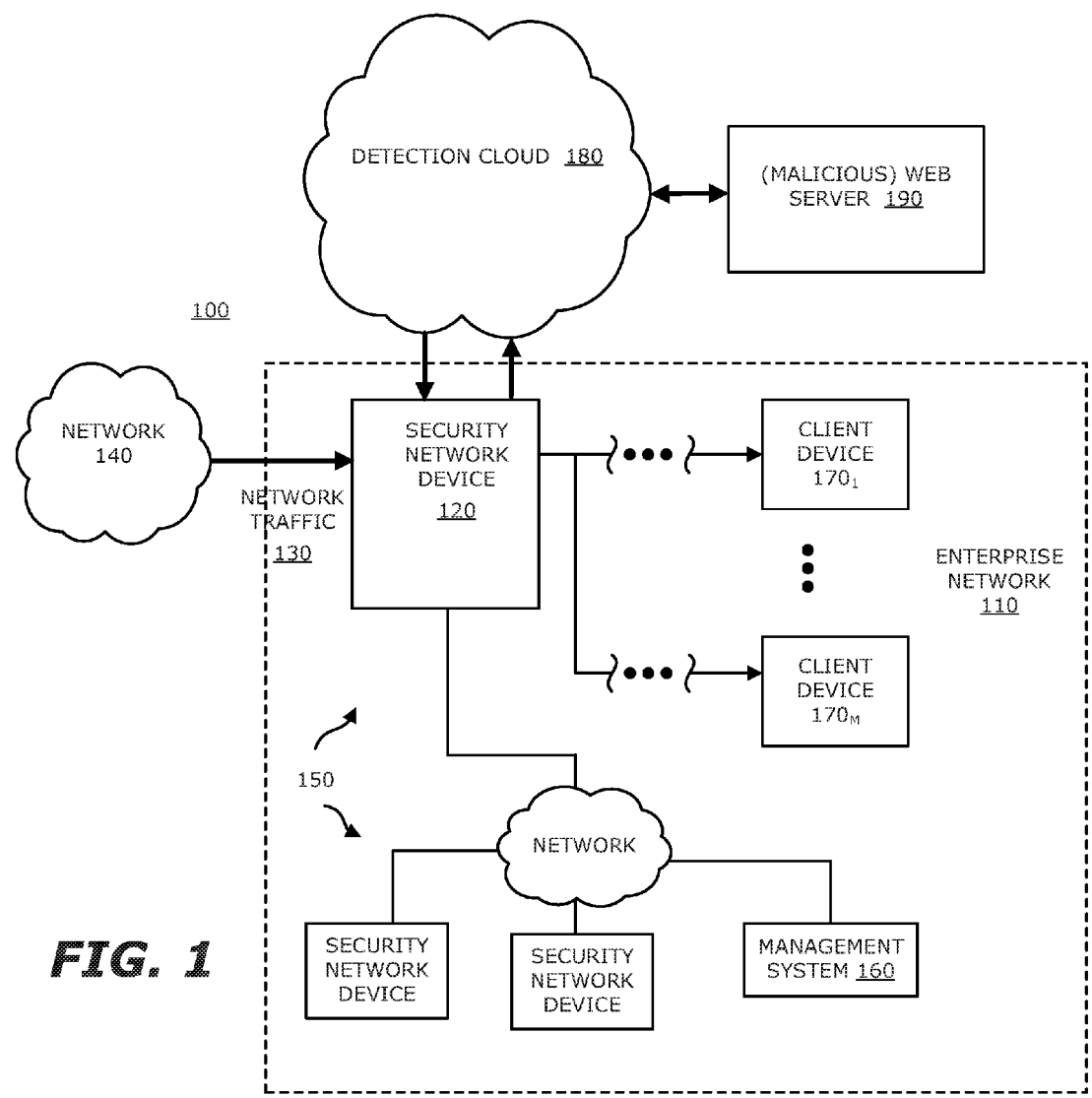
FIG. 1 is an exemplary block diagram of a communication system deploying a security network device adapted to conduct a preliminary analysis on objects associated with monitored network with more in-depth (dynamic) analysis being conducted remotely at a detection cloud.

Various embodiments of the disclosure relate to an electronic device with network connectivity, referred to as a "security network device" for example, which is responsible for conducting preliminary analysis of an object associated with monitored network traffic to determine whether the object appears to be part of a multi-phase malicious attack (e.g., beginning of a "drive-by attack" where an exploit is initially injected into a client device in order to effectuate subsequent downloading of the malicious payload). Upon determining that the object under analysis is suspected of being part of a malicious (drive-by) attack, the security network device uploads an identifier associated with the origin of the monitored network traffic (e.g., a Uniform Resource Locator "URL") to a detection cloud (e.g., cloud computing services conducting dynamic analysis at a prescribed location). Virtual execution logic within the detection cloud conducts an in-depth analysis of the suspicious URL by provisioning one or more virtual machines (hereinafter, "VM(s)") within the cloud to establish real-time communications with the malicious host. Thereafter, the behaviors of the VM(s) during communications with the source are monitored and the detected presence of certain anomalies may indicate that the network traffic is associated with a malicious (drive-by) attack. This embodiment constitutes an improvement to an existing technological process of malware detection.

As described below, one or more security network devices are located on-premises and are deployed within an enterprise network. For instance, a first security network device may be configured to conduct a preliminary analysis on one or more objects associated with monitored, incoming network traffic (e.g., web traffic). The preliminary analysis may include (i) pattern matching such as exploit matching; (ii) vulnerability checks; (iii) heuristic, statistical or deterministic analysis; or (iv) any combination thereof.

The first security network device is communicatively coupled to the detection cloud, which is configured to conduct dynamic analysis on information associated with one or more objects deemed "suspicious" by the first security network device. The dynamic analysis may involve virtual processing of the information associated with the suspicious object(s) by VM(s) deployed as part of virtual execution logic, where the detection cloud communicates directly or indirectly with a web server distributing web traffic including the suspicious object(s). The communicative coupling between the first security network device and the detection cloud may be achieved through a dedicated transmission medium or a non-dedicated transmission medium supporting secured (e.g. encrypted or otherwise obfuscated) communications.

According to one embodiment of the disclosure, deployed within the first security network device, a preliminary analysis engine filters objects associated with the web traffic and determines at least one identifier (e.g., URL) of a source for one or more of the objects that are determined to be "suspicious." An object is deemed "suspicious" when there is a prescribed probability of that object being associated with a malicious attack.

The preliminary analysis engine transmits the identifier of the source of the suspicious object(s) for use in VM-based analysis at a location outside the confines of the housing of the first security network device, normally at a geographic location remotely located from the first security network device. Stated differently, once the URL associated with a suspicious object has been identified by the preliminary analysis engine, instead of sending the suspicious URL to one or more VMs operating within the security network device itself, the suspicious URL along with certain ancillary data is sent to the detection cloud. The ancillary data comprises (1) an identification of a customer responsible for the security network device (hereinafter, "Customer_ID") and/or (2) a hash value for an Internet Protocol (IP) address of the client device targeted by the suspicious web traffic (hereinafter, "Hash(Client_IP_Addr)").

It is contemplated that providing ancillary data (e.g., Customer_ID, Hash(Client_IP_Addr), etc.) that corresponds to the suspicious URL is useful to customize functionality of the detection cloud, especially when the number of simultaneous VMs provisioned in the detection cloud for each customer may vary. Also, the types and number of software profiles (e.g., Guest OS and applications images) provisioned for these VMs can also vary based on customer preference and/or enterprise deployment. For instance, an enterprise network deploying network devices that are capable of operating with three different operating systems (OSes), such as Windows® XP, Windows® 7 and Windows® 8 for example, may provision and utilize a greater number software profiles for dynamic analysis than an enterprise with electronic devices loaded with a single type of OS, such as Windows® 8 only.

Once suitable VM(s) are provisioned within the detection cloud, the VM(s) establish a communication session with a suspect (e.g., potentially malicious) source, namely a suspect web server. The communication session may be established directly using the suspicious URL and the VM-based analysis is conducted using responses from this "live" website. "Live" website inter-communications are available since the on-premise, security network device detected the suspect web server being accessed from the enterprise network moments ago.

In cases where a malicious attack is detected by the VMs, an alert message including details of the infection (e.g., time of infection, URL name, malware name, etc.) is generated in the detection cloud. The alert message may be returned to the on-premises security network device, where information with the alert message may be populated within the local database and/or re-routed to one or more network administrators managing the enterprise network.

It is contemplated that the functionality of the security network device may be implemented with any type of electronic device, such as a client device that includes a desktop computer or a mobile device such as a laptop computer, netbook, tablet computer, or smart phone. Herein, the electronic device includes the preliminary analysis logic which, upon determining that an object under analysis is suspected of being part of a malicious (drive-by) attack, uploads an identifier associated with the origin of the monitored network traffic to the detection cloud.

Based on direct interaction with the suspect web server, the detection cloud conducts an in-depth analysis of the suspicious object, and when determined to be malicious, provides one or more alert messages to the electronic device. The alert message may provide a displayed warning to the user regarding the malicious attack or may signal logic within the electronic device to quarantine information associated with the malicious object or to conduct remediation operations.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data, such as a group of related packets associated with a request-response message pairing for example, normally having a logical structure or organization that enables classification for purposes of analysis. For instance, an object may be a self-contained element, where different types of such objects may include an executable file, non-executable file (such as a document or a dynamically link library), a Portable Document Format (PDF) file, a JavaScript file, Zip file, a Flash file, a document (for example, a Microsoft® Office® document, etc.), an electronic mail (email), downloaded web page, and/or an instant message accordance with Session Initiation Protocol (SIP) or another messaging protocol.

The term "flow" generally refers to a collection of related objects (e.g., messages), communicated during a single communication session between a single source network device (e.g., client device) and a single destination network device (e.g., server). For instance, a first flow (GET HTTP Request message) may be user initiated while subsequent flows (e.g., other HTTP messages initiated to complete the GET HTTP Request message) may be initiated automatically without user intervention.

A "communication session" may be defined as a semi-permanent information exchange between source and destination network devices. For example, the communication session may be in accordance with protocols at the application layer (e.g., Hypertext Transfer Protocol "HTTP"), session layer, or transport layer (e.g., Transmission Control Protocol "TCP") of the Open Systems Interconnection (OSI) model.

A "message" generally refers to information transmitted in a prescribed format, where each message may be in the form of one or more packets, frames, HTTP-based transmissions, or any other series of bits having the prescribed format.

The term "transmission medium" is a physical or logical communication path between two or more electronic devices (e.g., any devices with data processing and network connectivity such as, for example, a server, a mainframe, a computer such as a desktop or laptop, netbook, tablet, firewall, smart phone, router, switch, bridge, etc.). For instance, the communication path may include wired and/or wireless segments, and/or shared memory locations. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware. Also, the terms "compare" or "comparison" generally mean determining if a match (e.g., a certain level of matching) is achieved between two items where one of the items may include a particular signature pattern.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Exemplary Architectures

Referring to FIG. 1, an exemplary block diagram of a communication system 100 deploying a security network device 120, which is an electronic device that is deployed within an enterprise network 110 and adapted to analyze information associated with network traffic 130 received via a communication network 140. The communication network 140 may include a public network such as the Internet, in which case one or more network devices, such as a firewall for example, may be positioned in-front of or integrated into the security network device 120. Alternatively, the communication network 140 may be a private network such as a wireless data telecommunication network, wide area network, a type of local area network (LAN), or a combination of networks.

Herein, the security network device 120 may be one of a plurality of security network devices 150 that are geographically distributed from each other and communicatively coupled to a management system 160. The geographic distribution of the security network devices 150 may enable scalability to support growth of the enterprise network, and reduced customer response time in conducting dynamic analysis of submitted identifiers (e.g. URLs) based on distribution of work load in communications with detection cloud 180.

As shown, security network device 120, upon detection of suspicious network traffic, namely traffic having a prescribed probability of being part of a malicious attack, transmits information associated with the suspicious network traffic. For instance, as an illustrative example, the security network device 120 may transmit the URL associated with the suspicious traffic (sometimes referred to as the "suspicious URL") to detection cloud 180 that establishes communications with the potential malicious web server 190 for subsequent analysis of the communications.

Referring still to FIG. 1, the management system 160 may be adapted to manage the security network devices 150, including security network device 120. For instance, the management system 160 may be responsible for updating software executed by one or more hardware processors within the security network device 120. Such updating may be conducted automatically or conducted manually via uploads by an administrator. Also, such updating may be conducted freely among the security network devices or subject to a service subscription.

Of course, it is contemplated that, as an alternative embodiment, the functionality of the security network device 120 may be implemented with any or all of the client devices $170_1$-$170_M$ (where M≥1). Examples of the client devices $170_1$-$170_M$ include tablet computer, desktop or laptop computer, or smart phone. For clarity sake, the architecture and functionality of security network device 120 is described below.

Figure 2:
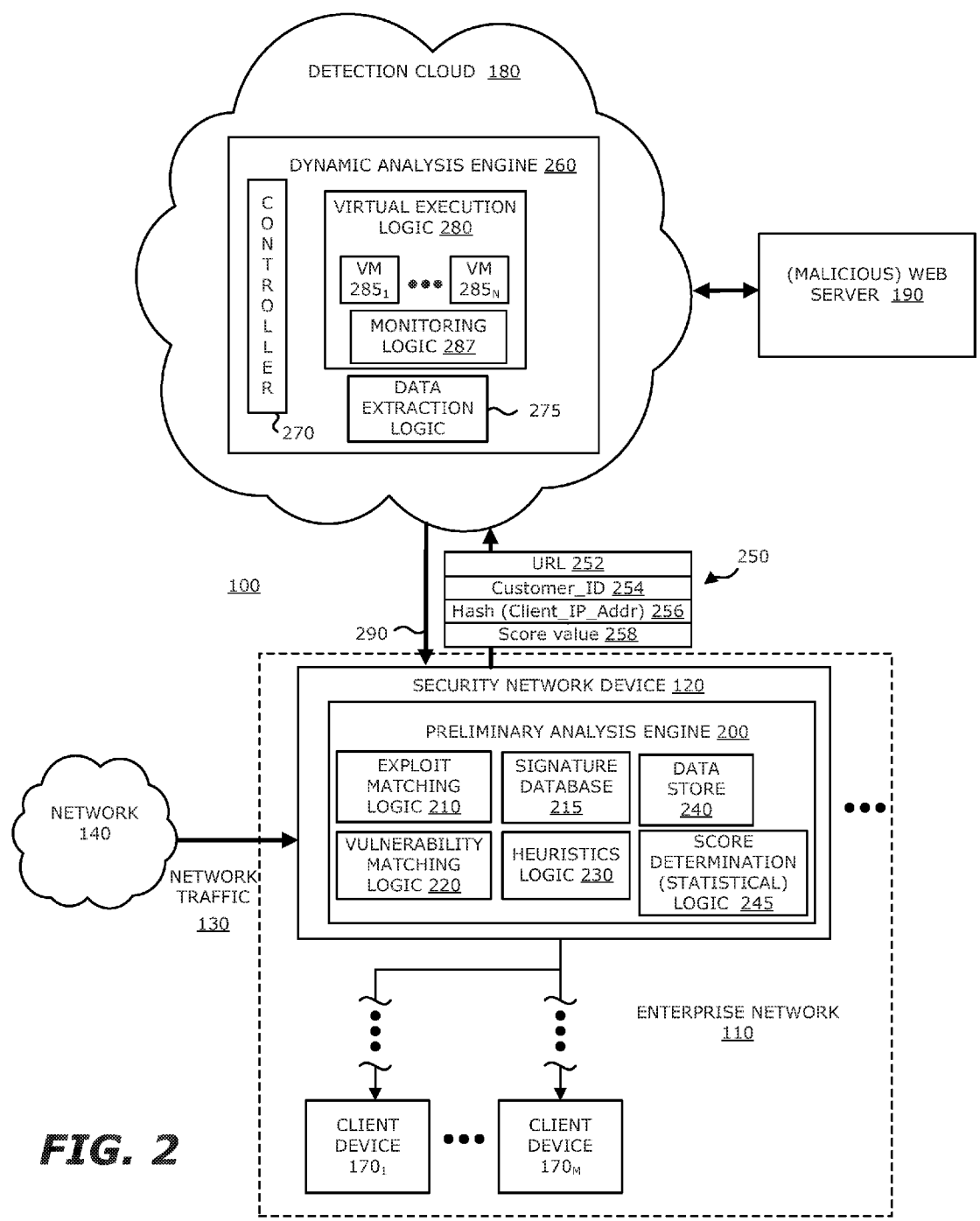
FIG. 2 is a more detailed block diagram of the communication system of FIG. 1.

Referring now to FIG. 2, the security network device 120 comprises a preliminary analysis engine 200 that is configured to analyze characteristics of objects associated with the network traffic 130. In particular, the preliminary analysis engine 200 may include one or more software modules that, when executed by one or more hardware processors located within the security network device 120, operate as a filter that (i) parses the incoming network traffic, (ii) aggregates and analyzes information associated with characteristics of the network traffic from the same source for a given communication session, and (iii) optionally stores information associated with the characteristics within the data store 240.

More specifically, preliminary analysis engine 200 may be configured with exploit matching logic 210, vulnerability matching logic 220 and/or heuristic logic 230. Exploit matching logic 210 is adapted to perform exploit signature checks, which may involve a comparison of a suspect object against one or more pre-stored exploit signatures (e.g., pre-configured and predetermined attack patterns) from signature database 215. Additionally or in the alternative, the preliminary analysis engine 200 may be configured with vulnerability matching logic 220 that is adapted to perform vulnerability signature checks, which may include a process of uncovering deviations in messaging practices set forth in applicable communication protocols (e.g., HTTP, TCP, etc.).

Also, additionally or in the alternative, the preliminary analysis engine 200 may be configured with heuristic logic 230 that is adapted for analysis of certain portions of an object to determine whether any portion corresponds to a "suspicious identifier." An example of a suspicious identifier may include, but are not limited or restricted to a particular URL that is associated with known exploits, a particular source or destination address that is associated with known exploits; particular exploit patterns; or particular shell code patterns.

A statistical analysis engine 245 may be configured, based on statistical analysis of the object under analysis, to generate a score value that represents a probability (or level of confidence) that this object is associated with a malicious attack. For instance, the score value may be based, at least in part, on (i) pattern matches; (ii) analyzed deviations in messaging practices set forth in applicable communication protocols (e.g., HTTP, TCP, etc.); (iii) analyzed compliance with certain message formats established for the protocol (e.g., out-of-order commands); and/or (iv) analyzed header or payload parameters to determine compliance. Where the score value exceeds a prescribed value (e.g., 9 out of 10), the object under analysis is deemed "suspicious". This score determination may also require assistance of some emulation (e.g. Javascript® emulation) techniques to de-obfuscate certain object types before they can be analyzed.

After the object under analysis is determined to be suspicious, the security network device 120 generates preliminary analysis results 250. The preliminary analysis results 250 are uploaded to a dynamic analysis engine 260 of the detection cloud 180, where the dynamic analysis engine 260 is responsible for dynamic analysis of network traffic resulting from accessing a website designated by the suspicious URL. According to one embodiment, the preliminary analysis results 250 comprise (1) a URL 252 associated with the website hosted by a potentially malicious web server 190 that previously provided the network traffic including the suspicious object, (2) an identifier 254 for an entity (company, individual, governmental department, etc.) that owns, leases or is responsible for the security network device 120 (hereinafter, "Customer_ID" 254), and/or (3) a hash value 256 for an Internet Protocol (IP) address of a client device $170_1$ targeted by the suspicious network traffic (hereinafter, "Hash(Client_IP_Addr)" 256). Optionally, the preliminary analysis results 250 may include the score value 258 generated by the statistical analysis engine 245.

According to one embodiment of the disclosure, the detection cloud 180 is a cloud computing service that is geographically remote from the security network device 120 and is responsible for conducting an in-depth analysis of resultant communications with a web server hosting a website designated by the suspicious URL. As an alternative embodiment, the detection cloud 180 may be implemented within a secure/isolated sub-network of the enterprise network rather than outside the enterprise network.

This in-depth analysis comprises virtual processing information received from communications with a website designated by the suspicious URL in order to determine (i) whether the communications are associated with a malicious attack and (ii) whether the web server providing such communications is infected with malware. The later determination may prompt placement of the web server onto a blacklist and/or cause the detection cloud 180 to transmit a message to notify the web server, either directly or through a third party (e.g., Internet service provider "ISP", wireless carrier, governmental agency, etc.) of the detected malicious attack. In general, under control of controller 270, data extraction logic 275 receives the preliminary analysis results 250 and extracts the URL 252, the Customer_ID 254, the Hash(Client_IP_Addr)" 256, and/or score value 258.

The URL 252 is used during virtual processing operations conducted by the dynamic analysis engine 260 to communicate with the web server 190 that distributed the suspicious web traffic in efforts to determine if the web server 190 is malicious (e.g., compromised servers that are unknowingly infected with malware so as to unintentionally propagate exploits to other network devices; server designed to infect network devices with particular exploits, etc.).

The Customer_ID 254 identifies the enterprise network 110 (and/or the specific security network device 120) that detected suspicious web traffic under further analysis by the virtual execution logic 280. The Customer_ID 254 ensures that the dynamic analysis results 290 are correctly returned. Additionally, through a customer portal, each customer may choose a configuration of guest images that are run within a provisioned virtual machine of the one or more virtual machines (VMs) $285_1$-$285_N$ (N≥1) operating inside the detection cloud 180. As a result, the Customer_ID 254 and/or the Hash(Client_IP_Addr) 256 may be used for provisioning one or more VMs $285_1$-$285_N$ with different types and/or versions of operating systems (e.g., Windows®-based OS, MAC-based OS, Windows® Mobile OS, Android®, iOS®, etc.), different types and/or versions of browser or other applications (e.g., Internet Explorer®, Mozilla®, Chrome®, FireFox®, Adobe Reader 8.0, MS Office 2013 etc.) supported by and available to the virtual execution logic 280. The Hash(Client_IP_Addr) 256 may also be used for recording purposes to identify targeted client devices. The goal of this customization is to get the closest possible match to the operating system and application versions that are running on the endpoints in the customer's network.

Aspects of the invention may be practiced for providing malware detection services to customers who, for example, avail themselves of the services on a paid subscription basis. For instance, where the customer subscribes to a particular service level, the Customer_ID 254 may cause the dynamic analysis engine 260 to provision a first set of VMs (e.g., "X" VMs) or provision VMs until a first prescribed VM capacity level has been reached (e.g. 100 simultaneous VMs). Where additional VM capacity may be necessary to provision VMs for additional OS or application configurations that may be necessary to provide a complete analysis (e.g., where targeted client device identified by Hash(Client_IP_Addr) is capable of supporting a large subset of browsers), the controller 270 may issue an alert message to network security personnel of the enterprise network 110 for authorization to increase the subscription level that would enable VMs to be provisioned until a second prescribed VM capacity level has been reached (e.g., 200 simultaneous VMs).

After the VMs $285_1$-$285_N$ have been provisioned, the virtual execution logic 280 virtually processes the suspicious URL 252 which initiates a HTTP Request message that is sent to the web server 190 and establishes a communication session with the web server 190 or another web server for re-direction to web server 190. Such redirection is intended to provide an added level of protection from being detected by malware and malicious actors. Subsequent communications during the established communication session are monitored for anomalous behaviors, such as receiving content with embedded executables that alter registry keys of the OS, upload of a subroutine such as Command and Control (CnC) exploit, receipt of call-back commands, etc. Monitoring logic 287 within the virtual execution logic 280 captures the anomalous behaviors, which are subsequently reported to the security network device 120 or another network device within the enterprise network 110 for reporting to network administrator(s).

III. Exemplary Detection Cloud Threat Detection Processes

Figure 3A:
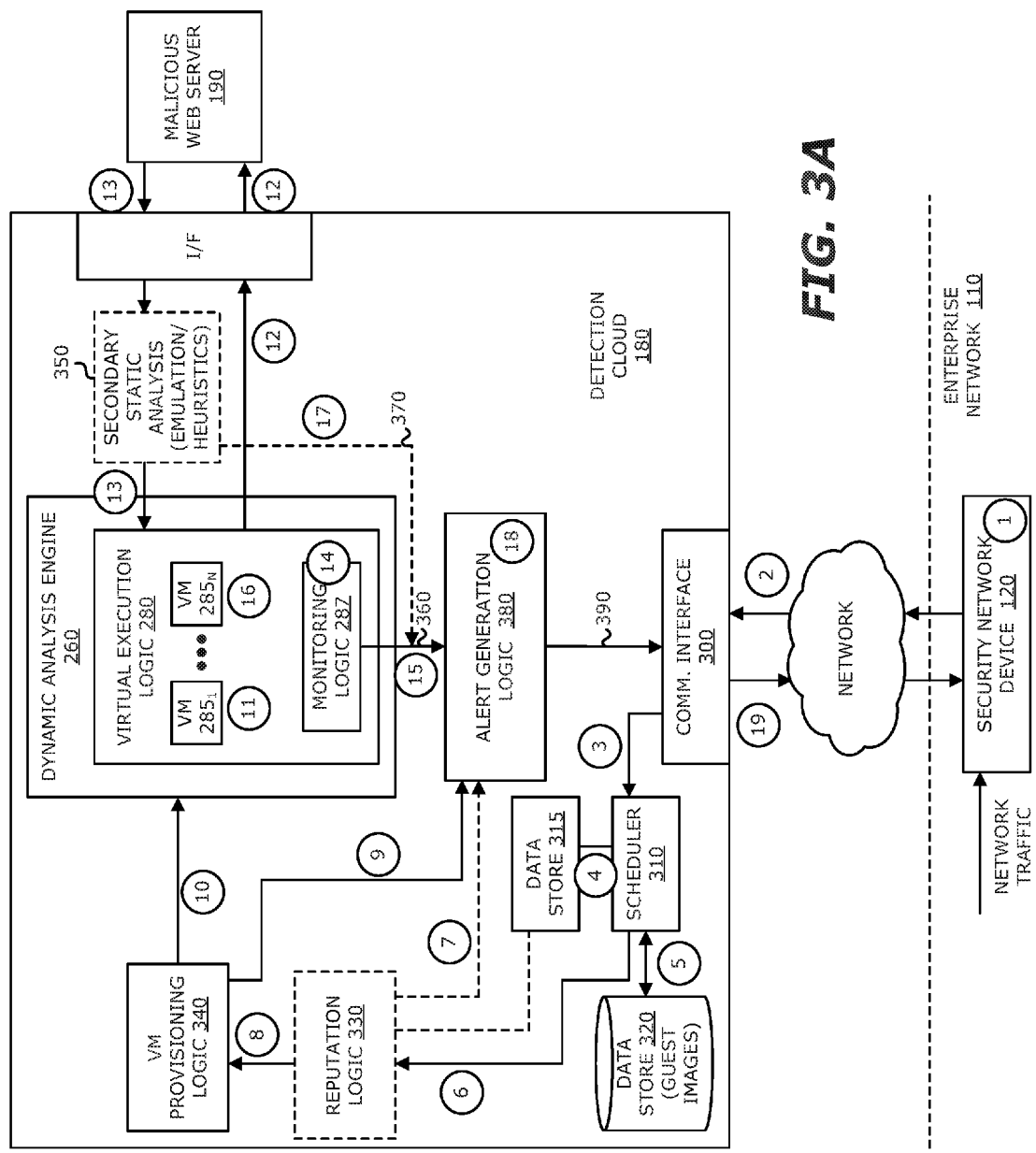
FIG. 3A is a first exemplary block diagram of the communication system of FIG. 2, where the operations conducted by the security network device and the detection cloud are described.

Referring to FIG. 3A, a first exemplary block diagram of the communication system 100 is shown, where the operations conducted by the security network device 120 and the detection cloud 180 are identified. According to one embodiment of the disclosure, the security network device 120 analyzes portions of incoming web traffic (operation_1).

Upon determining that an object associated with monitored web traffic appears to be part of a multi-phase malicious attack (e.g., beginning of a "drive-by attack" where the exploit is loaded and the malicious payload is loaded subsequently), the security network device 120 submits the preliminary analysis results 250 to the detection cloud 180 via communication interface 300 (operation_2). Of course, as an alternative embodiment, the network security device may only upload the preliminary analysis results to the detection cloud 180 if the customer subscribes to that service and/or the score value assigned to the object is above a certain threshold.

As described above, the preliminary analysis results 250 comprise a first identifier (e.g., URL) 252 associated with the website hosted by a potentially malicious web server 190, (2) a second identifier 254 (e.g., Customer_ID) that identifies the customer responsible for the security network device 120, and/or (3) a third identifier 256 (e.g., Hash (Client_IP_Addr)) that can be used to identify the IP address of the client device $170_1$ targeted by the suspicious web traffic as shown in FIG. 2.

Upon receipt by the detection cloud 180, a scheduler 310 receives the preliminary analysis results 250 and stores contents of the preliminary analysis results 250 into a first data store 315 (operation_3 and operation_4). The first data store 315 is accessible by scheduler 310, reputation logic 330, VM provisioning logic 340, dynamic analysis engine 260, and/or alert generation logic 380.

Thereafter, the scheduler 310 conducts a look-up of a second data store 320 to identify guest software images, namely software images of operating systems, applications or other software components for provisioning one or more VMs $285_1$-$285_N$ (operation_5). The identification as to which software profiles for use in provisioning the VMs $285_1$-$285_N$ may be accomplished through the use of the Customer_ID to identify the customer with ownership of the enterprise network and/or the Hash(IP Client Addr) to identify the specific client device(s) targeted to receive the suspicious web traffic.

For instance, based on the Customer_ID, the scheduler 310 operating in combination with VM provisioning logic 340 may configure VMs $285_1$-$285_N$ with software profiles corresponding to software images stored within client devices $170_1$-$170_M$ of FIG. 1 that are actually implemented within the enterprise network 110. As an alternative embodiment, the VMs $285_1$-$285_N$ may be configured according to different types and/or versions of software configurations that can be used by client devices $170_1$-$170_M$ connected to enterprise network 110 (e.g., client device 230) or even the most prevalent types of software configurations (e.g., a Windows® 8 OS; a popular version of Internet Explorer® web browser currently in use; popular version of Adobe® PDF™ reader application currently in use, etc.) or simply an appropriate software profile to process the content.

As an optional feature shown in dashed lines, the detection cloud 180 may comprise reputation logic 330 that conducts operations to customize and/or optimize operability of the virtual execution logic 280 (operation_6). Stated differently, one function of the reputation logic 330 is to avoid conducting dynamic analysis associated with suspicious URLs that are already determined to be malicious or benign.

For instance, the reputation logic 330 may operate in combination with the scheduler 310 to select software profiles (e.g., guest images) that are more prone to attack by Japanese-based websites in lieu of U.S. based websites where the detection cloud 180 handles network traffic in Japan. Additionally, the reputation logic 330 may include blacklists or whitelists that identify URLs determined to be non-malicious, perhaps including age-based results to identify stale results by recording the last time that the URL was determined to be non-malicious. A match of the blacklist may prompt the reputation logic 330 to transmit data for generation of an alert message (operation_7). This alert message will be identical to a Web-infection alert generated locally on the security device 120 in its current shipping version.

Herein, the VM provisioning logic 340 receives the selected guest software images along with the Customer_ID (operation_8). The Customer_ID may be used to determine, for the particular customer, a maximum number of simultaneous VMs allowed to run in the detection cloud 180 for that particular customer. If processing and/or storage capacities are approaching or have exceeded maximums so that all of the selected guest images cannot be provisioned to concurrently run (at the same time or in an overlapping manner) on the VMs, information is provided to alert generation logic 380 to generate a message that alerts network security personnel of the customer associated with the enterprise network that he/she may want to alter its subscription to increase execution capacity (operation_9).

Thereafter, the VMs $285_1$-$285_N$ are provisioned within the virtual execution logic (operation_10) and subsequently launched. Upon launching, one or more VMs commence to virtually execute a browser application which now attempts to access a website hosted by the "live" web server 190 using the suspicious URL and establish a communication session (operations_11&12). For instance, a first VM $285_1$ that virtually executes the browser application transmits a GET, POST or other HTTP request message to web server 190 using the suspicious URL.

In response, the web server 190 hosting the accessed website returns information, perhaps as part of a response message, to the first VM $285_1$ (operation_13). Monitoring logic 287 within the virtual execution logic 280 may be configured to monitor behaviors of one or more VMs $285_1$, ..., and/or $285_N$, such as VM $285_1$ configured to execute the browser application that launched the suspicious URL (operation 14). This monitoring is conducted to detect anomalous (unexpected or irregular) activity indicative of an exploit. When anomalous activity is detected, the monitoring logic 287 operating with an optional score determination logic (not shown) may route VM-based results 360 (e.g., computed score, information associated with the detected anomalous behaviors, and other information associated with the detected malicious activity by the suspect object) to the alert generation logic 380 (operation_15). Of course, as an option, the security network device 120 may conduct further analysis on information from the web server 190 in parallel with (at the same time or in an overlapping manner) or following the virtual processing by the virtual execution logic 280.

While monitoring logic 287 analyzes information exchanged with the web server 190, the first VM 285₁ continues its communication session with the web server 190 (operation_16). The communication session is maintained until a prescribed time has elapsed or the monitoring logic 287 has conducted sufficient operations to determine that the web server 190 is malicious or non-malicious.

Although not shown, it is noted that score determination logic may be implemented within the dynamic analysis engine 260 or the alert generation logic 380 so that VM-based results 360 may be subsequently weighted by the alert generation logic 380 upon reporting the findings by the virtual execution logic 280.

Optionally, prior to passing the information from the web server 190 to the virtual execution logic 280, secondary analysis logic 350 may initially conduct additional operations (e.g., emulation, heuristics, etc.) on the information in order to determine whether the content within the response can be determined to be malicious or benign without further processing by the VMs 285₁-285ₙ (operation_17). For instance, secondary analysis logic 350 may compare the page URL, returned content and software profile with similar responses of both malicious and non-malicious servers.

If a match is found, where the match is directed to a response from a malicious server, according to one embodiment, results 370 of the secondary analysis are provided to the alert generation logic 380 to produce one or more alert messages to represent that the URL is associated with a malicious server. Otherwise, the virtual execution logic 280 may be notified that the URL is associated with a non-malicious server and to discontinue further virtual processing associated with the suspicious URL.

Upon receiving the VM-based results 360 or the secondary analysis results 370, the alert generation logic 380 generates alert messages 390 to identify that the web traffic is associated with a malicious attack based on analyzed interaction with a malicious web server (operation_18). The alert messages 390 are routed to the security network device 120, which conducts certain post-processing operations such as mapping the alert message to a corresponding client device using the hash(IP Client Addr) and/or storing the alert message for subsequent conveyance for display and access by network security personnel of the enterprise network 110 (operation_19).

Figure 3B:
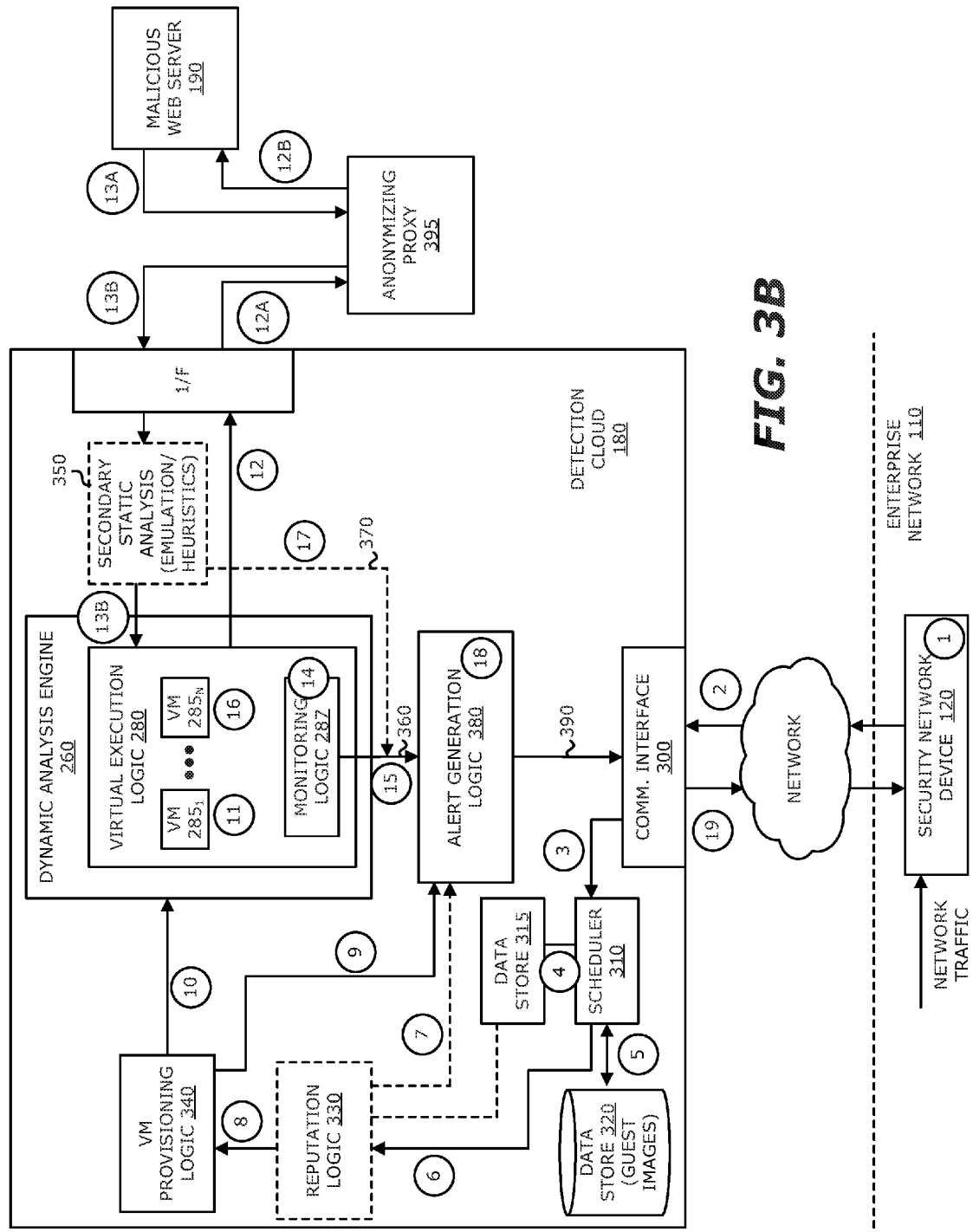
FIG. 3B is a second exemplary block diagram of the communication system of FIG. 2, where the operations conducted by the security network device and the detection cloud are described.

Referring to FIG. 3B, a second exemplary block diagram of the communication system 100 is shown, where operations conducted by the security network device 120 and the detection cloud 180 are described. According to this embodiment of the disclosure, a set of anonymizing proxies 395 is positioned between the detection cloud 180 and the web server 190 (operations_12A/12B/13A/13B). The anonymizing proxy 395 operates to obfuscate the origination of the HTTP GET or POST request so that the web server 190 does not create defenses by refraining to transmit exploits for access requests within the client IP address range.

IV. Exemplary Threat Detection and Prevention Processes

Figure 4:
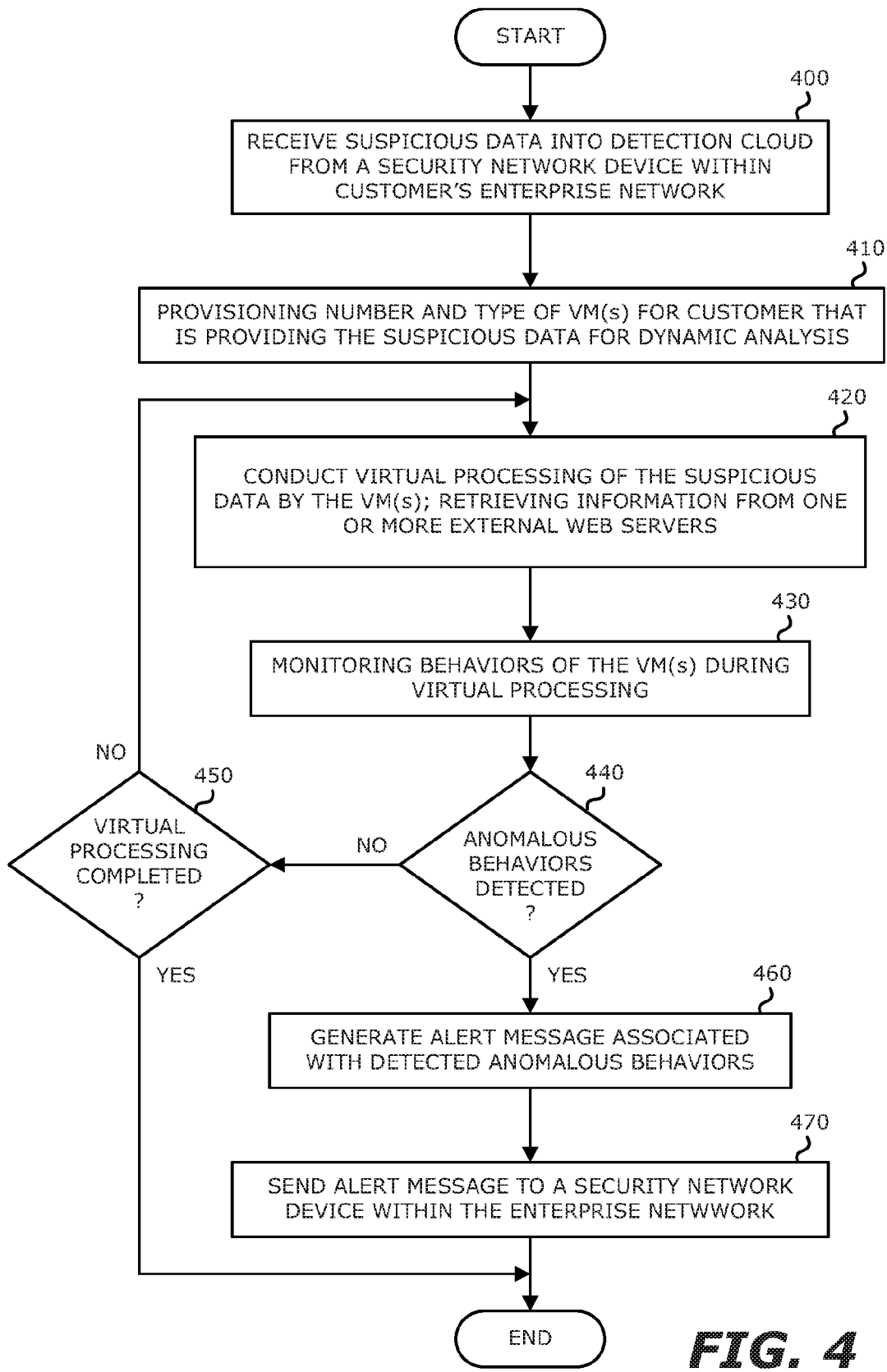
FIG. 4 is a general exemplary flowchart illustrating a threat detection process, where VM-based analysis is conducted within the detection cloud separate from the security network device.

Referring to FIG. 4, a general exemplary flowchart illustrating a threat detection process is shown, where VM-based analysis is conducted within a detection cloud separate from the security network device. First, the detection cloud receives, from a security network device, an identifier (e.g., a URL) that sources objects from monitored web traffic that are determined to be "suspicious" (block 400). The security network device is implemented within an enterprise network and has secured access to the detection cloud. In response to receipt of the suspicious identifier, logic within the detection cloud provisions one or more VMs within the virtual execution logic and conducts virtual processing of the suspicious identifier (blocks 410 and 420). During virtual processing of the suspicious identifier, one or more web servers are accessed to retrieve information therefrom.

During virtual processing, the behaviors of the one or more VMs are monitored and a determination is made as to whether any anomalous behaviors (e.g., processing or communication behaviors) have been detected (blocks 430 and 440). If not, a determination is made as to whether the virtual processing of the suspicious identifier has completed (block 450). If the virtual processing has completed, the threat detection process ends. Otherwise, the virtual processing continues and the resultant behaviors of the one or more VMs are monitored.

Upon detecting anomalous behaviors by the one or more VMs during virtual processing, one or more alert messages may be generated. An alert message may comprise the URL now determined to be associated with a malicious web server along with information associated with the detected anomalous behaviors and the Hash(IP Client Addr) to identify the targeted client device (block 460). Thereafter, as set forth in block 470, the alert message is sent to the security network device within the enterprise network for post-processing and providing such findings in a manner that can be perceived by network security personnel (e.g., GUI display, audio message, text message, etc.).

Figure 5:
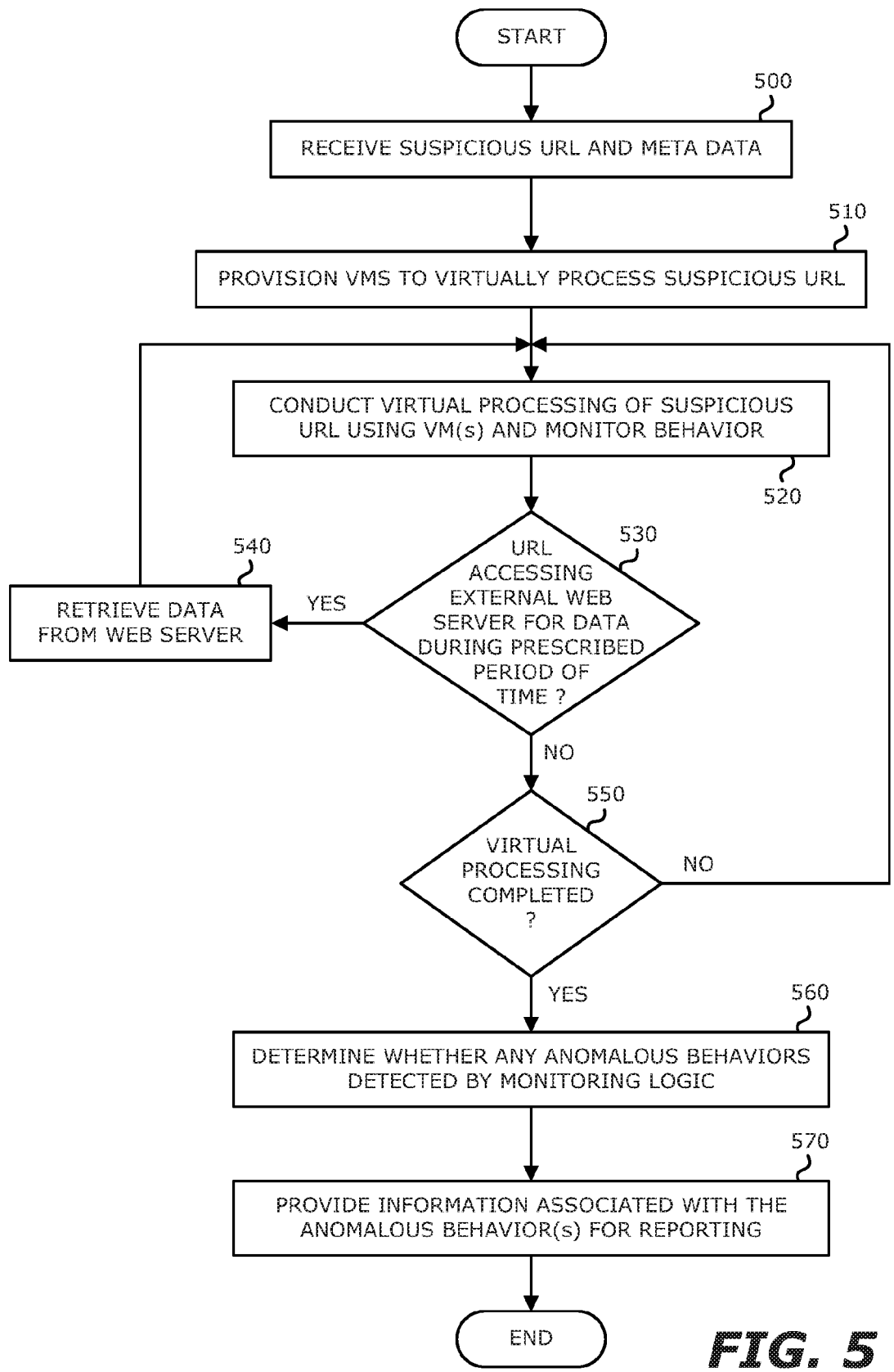
FIG. 5 is a more-detailed exemplary flowchart illustrating a threat detection process, where VM-based analysis is conducted within the detection cloud separate from the security network device.

Referring to FIG. 5, a more-detailed exemplary flowchart illustrating a threat detection process is shown, where VM-based analysis is conducted within a detection cloud separate from the security network device. First, the detection cloud receives, from a security network device, a URL that sources objects from monitored web traffic that are determined to be "suspicious" along with ancillary metadata that may be used for customer identification, VM provisioning and reporting purposes (block 500). The security network device is implemented within an enterprise network associated with a particular client and has secured access to the detection cloud. In response to receipt of the suspicious URL and corresponding metadata, logic within the detection cloud provisions one or more VMs within virtual execution logic deployed within the detection cloud and conducts virtual processing of the suspicious URL (blocks 510 and 520). During virtual processing of the suspicious URL, one or more web servers are accessed to retrieve information therefrom (blocks 530-550).

During virtual processing, the behaviors of the one or more VMs are monitored by the monitoring logic and a determination is made as to whether any anomalous behaviors have been detected (block 560). Upon detecting anomalous behaviors by the one or more VMs during virtual processing, the information associated with the anomalous behaviors is reported back to the enterprise network, such as providing a return message to the security network device (block 570).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A network security system comprising:
a security network device to conduct an analysis on network traffic, the analysis on the network traffic includes detecting a suspicious object associated with the network traffic and determining information associated with the suspicious object, the security network device further uploading (i) the information associated with the suspicious object, and (ii) ancillary data including information that identifies a customer associated with the security network device; and
a detection cloud including (i) one or more virtual machines that are provisioned in accordance with at least a portion of the uploaded ancillary data to customize functionality of the detection cloud for analysis of the suspicious object to determine whether the suspicious object is part of a malicious attack, and (ii) alert generation logic that generates a message to request a change of a subscription to increase either a processing or storage capacity allocated for the customer upon a determination that the processing or storage capacity associated with the one or more virtual machines is approaching or has reached a maximum capacity level as provided by the subscription.

2. The network security system of claim 1, wherein the information associated with the suspicious object includes an identifier being an Uniform Resource Locator (URL) being used to retrieve the suspicious object from an external source.

3. The network security system of claim 1, wherein the ancillary data including the information that is used to identify a path for analysis results to the customer via the security network device that is part of an enterprise network.

4. The network security system of claim 1, wherein the information that identifies the customer being part of the ancillary data includes a customer identification that is used to select a number of software profiles and one or more types of the software profiles for provisioning the one or more virtual machines.

5. The network security system of claim 1, wherein the information that identifies the customer being part of the ancillary data includes information that indicates software profiles for provisioning the one or more virtual machines.

6. The network security system of claim 1, wherein the detection cloud is customized by (i) setting the one or more virtual machines to a plurality of virtual machines less than or equal to a maximum number of simultaneous virtual machines allowed to run in the detection cloud for the customer and (ii) selecting a type or types of software profiles for use by the one or more virtual machines.

7. The network security system of claim 1, wherein the detection cloud includes virtual machine provisioning logic and a scheduler that, when executed by hardware circuitry, customizes functionality of the detection cloud by provisioning the one or more virtual machines in accordance with the subscription purchased by the customer.

8. The network security system of claim 1, wherein the detection cloud includes virtual machine provisioning logic and a scheduler that, based on at least the portion of ancillary data, further customizes the functionality of the detection cloud through provisioning of the one or more virtual machines by selecting a number of software profiles in accordance with a preference of the customer.

9. The network security system of claim 1, wherein the alert generation logic of the detection cloud generates the message to the customer to increase the processing capacity associated with the subscription of the customer upon the determination that the processing capacity of the one or more virtual machines has been exceeded.

10. The network security system of claim 1, wherein the security network device is a mobile device that includes a preliminary analysis engine that parses the network traffic and analyzes information associated with characteristics of the network traffic, the preliminary analysis engine analyzes the information by performing one or more signature checks that include comparing an object against one or more pre-stored signatures.

11. The network security system of claim 1, wherein the information that identifies the customer associated with the security network device includes an Internet Protocol (IP) address of a network device being targeted by the network traffic including the suspicious object.

12. The network security system of claim 1, wherein the security network device includes a preliminary analysis engine that parses the network traffic and analyzes information associated with characteristics of the network traffic, the preliminary analysis engine analyzes the information by performing an analysis of messaging practices of a communication protocol used by the network traffic to uncover deviations in the messaging practices.

13. The network security system of claim 1, wherein the detection cloud is a first sub-network of an enterprise network, a second sub-network different than the first sub-network includes the security network device.

14. The network security system of claim 1, wherein the security network device is deployed within an enterprise network and the detection cloud being situated at a geographic location remotely located from the enterprise network.

15. The network security system of claim 1, wherein the detection cloud further includes a reputation logic that selects software profiles that are more susceptible to attack given an origin of the network traffic.

16. The network security system of claim 15, wherein the reputation logic is further configured to detect, using blacklists, whether the suspicious object are malicious or, using whitelists, whether the suspicious object is not malicious.

17. The network security system of claim 1, wherein the information that identifies the customer comprises at least one of a customer identifier and a device address of the customer.

18. The network security system of claim 1 further comprising a customer portal, via which the customer associated with the security network device is able to select a configuration of the one or more software profiles for the one or more virtual machines, including one or more types or versions of operating systems and applications supported by and available to execution logic.

19. The network security system of claim 1, wherein the detection cloud further comprises execration logic responsive to customer selected configurations via a customer portal to provision the one or more virtual machines with types or versions of operating systems and applications.

20. The network security system of claim 1, wherein the detection cloud further comprises execution logic to process the suspicious object and capture behaviors during processing of the suspicious object to determine whether the suspicious object is associated with a malicious attack, and cause a result of the determination of a malicious attack to be sent as an alert message to the customer.

21. The network security system of claim 20, wherein the alert message is sent to the customer via the network security device.

22. The network security system of claim 1, wherein the processing or storage capacity comprises a capacity of the one or more virtual machines.

23. The network security system of claim 22, wherein the capacity of the one or more virtual machines comprises a number of virtual machines of the one or more virtual machines operating at the same time.

24. A network security system comprising:
a security network device to conduct an analysis on network traffic, the analysis on the network traffic includes detecting one or more suspicious objects associated with the network traffic and determining an identifier associated with the one or more suspicious objects, the security network device further uploading (i) the identifier and (ii) ancillary data including a customer identification that includes information identifying a customer associated with the security network device and data representative of a targeted client device; and
a detection cloud including one or more virtual machines that are provisioned in accordance with at least a portion of the uploaded ancillary data to customize functionality of the detection cloud for each customer by (i) setting the one or more virtual machines to a number of virtual machines that are assigned to the customer identified by the customer identification and (ii) selecting a type or types of software profiles for use by the one or more virtual machines,
wherein the detection cloud further comprises alert generation logic that generates a message to request a change of a subscription to increase either a processing capacity or a storage capacity allocated for the customer by the one or more virtual machines upon a determination that the processing or storage capacity associated with the one or more virtual machines is approaching or has reached a maximum capacity level as provided by the subscription.

25. The network security system of claim 24, wherein the identifier is an Uniform Resource Locator (URL) being used to retrieve the one or more suspicious objects from an external source.

26. The network security system of claim 24, wherein the detection cloud includes virtual machine provisioning logic and a scheduler that, when executed by hardware circuitry, customizes functionality of the detection cloud by provisioning the one or more virtual machines in accordance with the subscription as paid by the customer.

27. The network security system of claim 26, wherein the virtual machine provisioning logic and the scheduler, based on at least the portion of uploaded ancillary data, further customizes the functionality of the detection cloud through provisioning of the one or more virtual machines by selecting a number of software profiles in accordance with a preference of the customer for use by the one or more virtual machines.

28. The network security system of claim 24, wherein the security network device includes a preliminary analysis engine that parses the network traffic and analyzes information associated with characteristics of the network traffic, the preliminary analysis engine analyzes the information by performing one or more signature checks that include comparing an object against one or more pre-stored signatures.

29. The network security system of claim 24, wherein the customer information includes an Internet Protocol (IP) address of network device being targeted by the network traffic including the one or more suspicious objects.

30. The network security system of claim 24, wherein the data representative of the targeted client device includes a hash value of an Internet Protocol (IP) address of the targeted client device.

31. The network security system of claim 24, wherein the detection cloud is a first sub-network of an enterprise network, a second sub-network different than the first sub-network includes the security network device.

32. The network security system of claim 24, wherein the security network device is deployed within an enterprise network and the detection cloud being situated at a geographic location remotely located from the enterprise network.

33. The network security system of claim 24 further comprising a customer portal, via which the customer associated with the security network device is able to select a configuration of one or more software profiles for the one or more virtual machines, including one or more types or versions of operating systems and applications supported by and available to execution logic operating within the detection cloud.

34. The network security system of claim 24, wherein the detection cloud further comprises execution logic responsive to customer selected configurations via a customer portal to provision the one or more virtual machines with types or versions of operating systems and applications.

35. The network security system of claim 24, wherein the detection cloud further comprises execution logic to process the suspicious object and capture behaviors during processing of the suspicious object to determine whether the suspicious object is associated with a malicious attack, and cause a result of the determination of a malicious attack to be sent as an alert message to the customer.

36. The network security system of claim 35, wherein the alert message is sent to the customer via the network security device.

37. The network security system of claim 24, wherein the processing capacity or the storage capacity comprises a capacity of the one or more virtual machines.

38. A system comprising:
a security network device to conduct an analysis on received network traffic to detect a suspicious object associated with the network traffic, determine an identifier associated with a source of the suspicious object, and upload (i) information associated with the suspicious object, and (ii) ancillary data including information that identifies a customer associated with the security network device; and
a detection cloud including provisioning logic and one or more virtual machines that are provisioned by the provisioning logic in accordance with at least a portion of the uploaded ancillary data, the provisioning logic to customize functionality of the detection cloud for a specific customer for analysis of the suspicious object to determine whether the suspicious object is part of a malicious attack, the detection cloud further comprises alert generation logic that generates a message to the customer to increase processing capacity associated with a subscription of the customer upon a determination that a processing capacity associated with the one or more virtual machines is approaching or has reached a maximum capacity level as provided by the subscription.

39. The network security system of claim 38, wherein the information associated with the suspicious object includes an identifier being an Uniform Resource Locator (URL) being used to retrieve the suspicious object from an external source.

40. The network security system of claim 38, wherein the uploaded ancillary data including a hash value for an address of a client device targeted by the network traffic including the suspicious object.

41. The network security system of claim 40, wherein the address is an Internet Protocol (IP) address of the client device.

42. The network security system of claim 38, wherein the provisioning logic provisions the one or more virtual machines by selecting types and a prescribed number of software profiles based on a preference of the customer identified by the uploaded ancillary data.

43. The network security system of claim 38, wherein the uploaded ancillary data includes information that indicates software profiles for provisioning the one or more virtual machines.

44. The network security system of claim 38, wherein the detection cloud is customized by (i) setting the one or more virtual machines to a plurality of virtual machines less than or equal to a maximum number of simultaneous virtual machines allowed to run in the detection cloud for the customer and (ii) selecting a type or types of software profiles for use by the one or more virtual machines.

45. The network security system of claim 38, wherein the security network device is a mobile device that includes a preliminary analysis engine that parses the network traffic and analyzes information associated with characteristics of the network traffic, the preliminary analysis engine analyzes the information by performing one or more signature checks that include comparing an object against one or more pre-stored signatures.

46. The network security system of claim 38, wherein the security network device includes a preliminary analysis engine that parses the network traffic and analyzes information associated with characteristics of the network traffic, the preliminary analysis engine analyzes the information by performing an analysis of messaging practices of a communication protocol used by the network traffic to uncover deviations in the messaging practices.

47. The network security system of claim 38, wherein the detection cloud is a first sub-network of an enterprise network, a second sub-network different than the first sub-network includes the security network device.

48. The network security system of claim 38, wherein the security network device is deployed within an enterprise network and the detection cloud is geographically located remotely from the enterprise network operating as a private network.

49. The network security system of claim 38, wherein the detection cloud further includes a scheduler and reputation logic that collectively operate to selects software profiles that are more susceptible to attack given an origin of the network traffic.

50. The network security system of claim 38, wherein the processing capacity comprises a capacity of the one or more virtual machines.

51. The network security system of claim 38, wherein the processing capacity comprises an analysis capacity of the detection cloud.

52. The network security system of claim 38 further comprising a customer portal, via which the customer associated with the security network device is able to select a configuration of the one or more software profiles for the one or more virtual machines, including one or more types or versions of operating systems and applications supported by and available to logic within the detection cloud.

53. The network security system of claim 52, wherein the provisioning logic further comprises execution logic responsive to the customer selected configurations to provision the one or more virtual machines with types or versions of operating systems and applications.

54. The network security system of claim 38, wherein the detection cloud further comprises execution logic to process the suspicious object and capture behaviors during processing of the suspicious object to determine whether the suspicious object is associated with a malicious attack, and cause a result of the determination of a malicious attack to be sent as an alert message to the customer.

55. The network security system of claim 54, wherein the alert message is sent to the customer via the network security device.

* * * * *